United States Patent [19]

Schmidt et al.

[11] 4,332,921
[45] Jun. 1, 1982

[54] POLYCARBONATE/POLYPHOSPHONATE THERMOPLASTIC COMPOSITION

[75] Inventors: Manfred Schmidt, New Martinsville, W. Va.; Joachim Wank; Eckart Reese, both of Dormagen, Fed. Rep. of Germany

[73] Assignee: Bayer Aktiengesellschaft, Leverkusen, Fed. Rep. of Germany

[21] Appl. No.: 220,946

[22] Filed: Dec. 29, 1980

[30] Foreign Application Priority Data

Jan. 25, 1980 [DE] Fed. Rep. of Germany ....... 3002550

[51] Int. Cl.$^3$ ............................................. C08L 69/00
[52] U.S. Cl. ........................... 525/462; 260/DIG. 24; 264/349
[58] Field of Search ................... 525/462, 2; 528/167; 260/45 PS, 45 P, DIG. 24; 264/176 R, 349

[56] References Cited

U.S. PATENT DOCUMENTS

| | | | |
|---|---|---|---|
| 3,719,727 | 3/1973 | Masai et al. | 528/167 |
| 3,932,566 | 1/1976 | Reader | 260/930 |
| 4,078,016 | 3/1978 | Kramer | 260/860 |
| 4,093,582 | 6/1978 | Mark et al. | 260/30.6 |

OTHER PUBLICATIONS

Polyesters, by I. Goodman and J. A. Rhys, London, ILLIFFE Books, Ltd., p. 3.
The Development and Use of Polyester Products, by E. N. Doyle, McGraw-Hill Book Company, p. 3.

*Primary Examiner*—Theodore E. Pertilla
*Attorney, Agent, or Firm*—Gene Harsh; Lawrence S. Pope; Aron Preis

[57] ABSTRACT

The invention is directed to compositions comprising halogen-free aromatic polycarbonates and halogen-free aromatic polyphosphonates suitable for producing films of improved flame resistance and to processes for their preparation.

11 Claims, No Drawings

16,332,921

POLYCARBONATE/POLYPHOSPHONATE THERMOPLASTIC COMPOSITION

FIELD OF THE INVENTION

The invention relates to films produced from mixtures of aromatic polycarbonates and aromatic polyphosphonates, in particular aromatic polymethylphosphonates.

DESCRIPTION OF THE PRIOR ART

Because of their good electrical and mechanical properties, polycarbonate films are commonly used in industry as, for example, electrical insulating films with a high heat distortion point. However, the burning properties of these films do not meet the technical requirements for all applications.

It is known that flame-resistant polycarbonate films can be produced, for example, by mixing oligomeric polycarbonates based on tetrahalogeno-bisphenols such as, for example, tetrabromo-bisphenol A (compare German Offenlegungsschrift No. 2,354,533). Such flame-resistant polycarbonate films have the disadvantage that when they are exposed to an external flame they may effect a corrosive action as a result of the gradual evolution of hydrogen halide such as hydrogen bromide, and are thus responsible for secondary damage caused to electrical components.

Thiis is of particular disadvantage when such films are used in electrical components in traffic, transportation, telecommunication and data processing equipment.

High molecular polyphosphonates (see, for example, German Patent Application No. P 29 44 093.5, LeA 19,968) are thermoplastics which have a very high fire resistance or are extremely noncombustible. The flame-resistant properties of films produced therefrom are good, since in cases of fire and at temperatures below the thermoplastic softening point of the polyphosphonates, no corrosive gases evolve and after-burning does not occur.

However, the electrical and mechanical properties of these polyphosphonate films are not completely satisfactory. Thus, for example, a film 0.05 mm thick produced from a polymethylphosphonate of 4,4'-dihydroxy diphenyl (compare Example 1 of German Patent Application No. P 29 44 093.5, LeA 19,968) has a specific volume resistivity $(\rho_D)$ which at 140° C. falls to 1/30,000 of its value at 20° C. and exhibits a sharp increase in the dielectric loss factor (tan $\delta$) at 130° to 140° C., while polycarbonate films have constant values up to almost 150° C. Compared to polycarbonate films, films based on the above-mentioned polyphosphonates have a somewhat lower tensile strength and a reduced resistance toward numerous solvents such as, for example, benzene and toluene and n-propanol mixtures, as is demonstrable by the stress-cracking tendency of polyphosphonate films upon their contact with such solvents.

BRIEF DESCRIPTION OF THE INVENTION

It has been found, surprisingly, that the disadvantages listed in the case of pure polycarbonate film and the disadvantages listed in the case of pure polyphosphonate film do not result if mixtures of the two polymers in a ratio of polycarbonate to polyphosphonate of between 40:60 and 85:15 are processed to films.

This advantageous change in the overall pattern of properties of the films made from blends of these polymers in the above-mentioned proportions is furthermore surprising since the individual components are present as two phases in the blends of the two polymers, as measurements of the shear modulus show.

Thus, for example, the values for the tensile strength, the elongation at break, the specific volume resistivity $(\rho_D)$ at 20° to 150° C. and the dielectric loss factor (tan $\delta$) at 20° to 150° C. of films produced from 80 parts by weight of a bisphenol A polycarbonate having a relative solution viscosity $(\eta_{rel})$ of 1.420 (measured in 0.5% strength solution in methylene chloride at 25° C.) and a weight-average molecular weight $(\overline{M}_w)$ of 42,000 and 20 parts by weight of a polymethylphosphonate based on 4,4'-dihydroxydiphenyl, having a relative solution viscosity $(\eta_{rel})$ of 1.316 (measured in 0.5% strength solution in methylene chloride at 25° C.) are analogous to those of a polycarbonate film of the same thickness, while the fire resistance of the former film, measured in accordance with test UL-94, achieve the best flame resistance classification, i.e., V-O. This classification is also achieved by a film of the same thickness of polymethylphosphonate based on 4,4'-dihydroxydiphenyl.

DETAILED DESCRIPTION OF THE INVENTION

Polycarbonates which are suitable according to the invention are aromatic homopolycarbonates and aromatic copolycarbonates based, for example, on one or more of the following diphenols: hydroquinone, resorcinol, dihydroxydiphenyls, bis-(hydroxyphenyl)alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxphenyl)-sulphones and $\alpha,\alpha'$-bis-(hydroxyphenyl)-diisopropylbenzenes and nuclear-alkylated derivatives thereof.

These and other suitable diphenols are described, for example, in U.S. Pat. Nos. 3,028,365; 2,999,835, 3,148,172; 2,991,273; 3,271,367 and 2,999,846, in German Offenlegungsschriften Nos. 1,570,703; 2,063,050; 2,063,052; 2,211,956 and 2,211,957; in French Patent Specification No. 1,561,518 and in the monograph "H. Schnell, Chemistry and Physics of Polycarbonates, Interscience Publishers, New York, 1964", all incorporated herein by reference.

The aromatic polycarbonates can be prepared by known processes, thus, for example, from bisphenol and diphenyl carbonate by the melt transesterification process and from bisphenols and phosgene by the two-phase boundary process, as described in the abovementioned literature.

The aromatic polycarbonates can be branched by incorporating small amounts, preferably amounts of between 0.05 and 2.0 mol % (relative to the diphenols employed), of compounds which are trifunctional or more than trifunctional, in particular those with three or more phenolic hydroxyl groups.

Polycarbonates of this type are described, for example, in German Offenlegungsschriften Nos. 1,570,533; 1,595,762; 2,116,974; 2,113,347 and 2,500,092; in British Patent Specification No. 1,079,821 and in U.S. Pat. Specification No. 3,544,514, all incorporated by reference herein.

The weight-average molecular weights of the polycarbonates which are suitable according to the invention should be over 24,000, preferably between 35,000 and 120,000, and in particular between 42,000 and 95,000 (determined from the intrinsic viscosity, measured in $CH_2Cl_2$ solution).

Aromatic polycarbonates in the context of the invention are, in particular, homopolycarbonates of bis-2-(4-hydroxyphenyl)-propane (bisphenol A) and copolycarbonates of at least 30 mol %, preferably at least 60 mol % and in particular at least 80 mol %, of bisphenol A and up to 70 mol %, preferably up to 40 mol % and in particular up to 20 mol %, of other diphenols (the mol percentages in each case relate to the total molar amount of co-condensed diphenols).

Other diphenols which are suitable are bis-(hydroxyaryl)-$C_1$-$C_8$-alkanes other than bisphenol A and bis-(hydroxyaryl)-$C_5$-$C_6$-cycloalkanes, in particular bis-(4-hydroxyphenyl)-$C_1$-$C_8$-alkanes and bis-(4-hydroxyphenyl)-$C_5$-$C_6$-cycloalkanes.

Examples of other suitable diphenols are bis-(4-hydroxyphenyl)-methane (bisphenol F); 2,4-bis-(4-hydroxyphenyl)-butane; 1,1-bis-(4-hydroxyphenyl)-cyclohexane; 2,2-bis-(3-methyl-4-hydroxyphenyl)-propane; bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methylbutane and 1,1-bis-(3,5-dimethyl-4-hydroxyphenyl)-cyclohexane.

Copolycarbonates which are preferred according to the invention contain bisphenol A and 1,1-bis-(4-hydroxyphenyl)-cyclohexane (bisphenol Z).

Thermoplastic polyphosphonates suitable according to the invention are optionally branched aromatic copolyphosphonates having an average molecular weight (number-average $\overline{M}_n$) of 11,000 to 200,000 and consist of recurring units having the structures $$\left[\begin{matrix} O \\ \| \\ -P-O-X-O- \\ | \\ R' \end{matrix}\right] \quad (A)$$

and optionally $$\left[\begin{matrix} O \\ \| \\ -P-O-Y-O- \\ | \\ [O]_a \\ | \\ R^2 \\ | \\ [O]_b \end{matrix} \quad \left[\begin{matrix} O \\ | \\ X \\ | \\ O \end{matrix}\right]_c \right] \quad (B)$$

and (C) in the structures (A) and (B), the end members $$-O-\!\!\!\bigcirc\!\!\!-_{(D)p}$$

—OH and —O—X—OH bonded to phosphorus and the end members $$-H, \quad -\underset{R'}{\overset{O}{\underset{\|}{P}}}-O-\!\!\!\bigcirc\!\!\!-_{(D)p} \quad \text{and} \quad -\overset{O}{\underset{\|}{P}}-(O-\!\!\!\bigcirc\!\!\!-_{(D)p})_2$$

bonded to oxygen.

The symbols X, D, p and R' are explained below; the proportion of B), relative to the sum of (A) and (B), can be 0 to 3 mol %, and in the structures (A) and (B):

R' denotes at least one of the radicals $C_1$-$C_{12}$-alkyl, $C_2$-$C_{12}$-alkenyl or $C_6$-$C_{30}$-cycloalkyl, -cycloalkenyl, -aryl, -arylalkyl or -arylalkenyl, the particular aryl group being unsubstituted or substituted by 1 to 5 $C_1$-$C_4$-alkyl groups; X denotes at least one of the radicals phenylene ⌬, biphenylene ⌬–⌬, $C_1$-$C_4$—alkylenebisphenylene ⌬—alkylene—⌬, $C_5$-$C_{12}$—cycloalkylenebisphenylene ⌬—cycloalkylene—⌬, thiobisphenylene ⌬—S—⌬, oxibisphenylene ⌬—O—⌬, sulphonylbisphenylene ⌬—$SO_2$—⌬, carbonylbisphenylene ⌬—$\underset{\underset{O}{\|}}{C}$—⌬ or naphthylene ⌬, each phenyl nucleus being unsubstituted or substituted by 1 to 4 $C_1$-$C_4$-alkyl groups and the naphthylene nucleus being unsubstituted or substituted by 1 to 6 radicals of at least one of the alkyl groups mentioned;

Y denotes a trivalent or quadrivalent radical of a trifunctional mononuclear or tri- or tetrafunctional polynuclear phenol, with the free valences in place of the phenolic hydroxyl groups, and, in the case of the polynuclear phenol, the aromatic nuclei carrying one or two phenolic hydroxyl groups can be linked by aliphatic $C_1$-$C_7$-hydrocarbon radicals or by at least one benzene radical; or Y denotes X if c=0, a=1 and b=1 and at the same time $R^2$=Y' —O—X—O)$_c$, or $R^2$=X, Y' being Y and c' being 1 or 2, a denotes 0 or the number 1,
b denotes 0 or the number 1,
c denotes 0 or the number 1 or 2, preferably 1 or 2, $R^2$ denotes R' if a and b are each 0, in which case Y must represent a trivalent or quadrivalent radical as defined above, or $R^2$ denotes

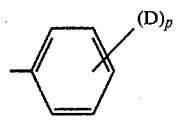

if a=1 or b=0, in which case Y must represent a trivalent or quadrivalent radical as defined above, or $R^2$ denotes X or Y' $+O-X-O)_c$, if a and b are each 1, the symbols D are identical or different and denote $C_1$-$C_4$-alkyl groups and p denotes 0 or a number from 1 to 5, preferably 0.

The preferred definitions of the symbols are as follows:

R' denotes at least one of the radicals methyl or phenyl, in particular methyl;

X denotes at least one of the radicals phenylene, biphenylene or $C_1$-$C_4$-alkylenebisphenylene, it being possible for each phenyl nucleus to be substituted by 1 to 4 methyl groups, or cyclohexylenebisphenylene, oxibisphenylene, thiobisphenylene or sulphonylbisphenylene, and in particular $C_1$-$C_4$-alkylenebisphenylene, it being possible for each phenyl nucleus to be substituted by one or two methyl groups, Y denotes a trivalent or quadrivalent radical of a trifunctional mononuclear or tri- or tetra-functional polynuclear phenol, with the free valences in place of the phenolic hydroxyl groups, and in the case of the polynuclear phenol the aromatic nuclei carrying one or two phenolic hydroxyl groups can be linked by aliphatic $C_1$-$C_7$-hydrocarbon radicals or by at least one benzene radical, a denotes 0 or the number 1,
b denotes 0 or the number 1,
c denotes the number 1 or 2,
$R^2$ denotes R' if a and b are each 0, or
$R^2$ denotes

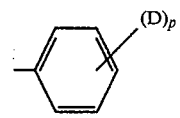

if a=1 and b=0, or $R^2$ denotes X or Y' $+O-X-O)_c$, if a and b are each 1, the symbols D are identical or different and denote $C_1$-$C_4$-alkyl groups, and p denotes 0 or a number from 1 to 5, in particular 0.

The thermoplastic aromatic polyphosphonates preferably have average molecular weights (number-average $\overline{M}_n$) of 13,000 to 80,000, in particular 13,000 to 40,000. The molecular weights are determined by the membrane osmosis method using membranes which are permeable to particles having a molecular weight of up to 3,000.

The preparation of the aromatic polyphosphonates is described, for example, in German Patent Application No. P 29 44 093.5 (LeA 19,968), incorporated herein by reference.

The polyphosphonates which are preferred according to the invention are obtained by the melt transesterification process described in the above patent application, by reaction of phosphonic acid diaryl esters, in particular phosphonic acid diphenyl esters, with aromatic dihydroxy compounds, if appropriate in the presence of 0.01 to 3 mol % (based on the phosphonic acid diaryl ester employed) of a triaryl phosphate and, if appropriate, in the presence of 0.01 to 3 mol % (based on the dihydroxy compound employed) of aromatic tri- or tetrahydroxy compounds, neutral esters of titanium, zirconium or vanadium, dialkyl-tin oxides, dialky-dialkoxy-tin compounds or mixtures of germanium dioxide with one of the above-mentioned catalysts being used as transesterification catalysts.

In detail, the preparation of polyphosphonates is taken from German Patent Application No. P 29 44 093.5 as follows:

105.1 mol of phosphonic acid diaryl ester, 99.1 mol of the aromatic diol and 0.1 mol of a quadrivalent compound with phenolic OH functional groups are mixed intensively in the presence of $2.27 \cdot 10^{-3}\%$ by weight (based on 100% by weight of the aromatic diol) of the catalyst at 250° C., under nitrogen. Phenol is distilled off over a column, heated to 100° C., in the course of three hours under a vacuum which is intensified from 250 to 100 mbars and at a temperature which is increased from 250° C. to 265° C. The transesterification is then continued for five hours under a pressure which is decreased gradually to 0.3 mbar and at an internal temperature which rises to 310° C., the viscosity of the melt increasing. The autoclave is flushed with nitrogen, the polymer is allowed to settle for one hour at 300° C. with the stirrer switched off and the product is isolated by extruding under pressure and granulating the extruded strand.

The present invention thus relates to mixtures of 40% by weight to 85% by weight, preferably 60% by weight to 85% by weight, of a halogen-free, aromatic polycarbonate (component A) with a $\overline{M}_w$ (weight-average molecular weight) greater than 24,000, preferably between 35,000 and 120,000 and in particular between 42,000 and 95,000, and 60% by weight to 15% by weight, preferably 40% by weight to 15% by weight, of a halogen-free aromatic polyphosphonate (component B) with a $\overline{M}_{OS}$ (number-average molecular weight $\overline{M}_n$ determined by membrane osmosis) of 11,000 to 200,000, preferably of 13,000 to 80,000 and in particular of 13,000 to 40,000.

The present invention also relates to the use of the polycarbonate/polyphosphonate mixtures according to the invention for the production of films, in particular extruded films or cast films, in a known manner.

The present invention thus also relates to films, in particular extruded films or cast films, of the polycarbonate/polyphosphonate mixtures according to the invention.

The polyphosphonate/polycarbonate mixtures according to the invention can be prepared by the following four processes:

1. By melting the polycarbonate and polyphosphonate together, with simultaneous or subsequent intimate mixing of the melt and subsequent extrusion of the homogenized melt in a suitable apparatus.

2. By melting the polycarbonate in a suitable apparatus and metering the polyphosphonate into the melt of the polycarbonate, homogenizing the melt and then extruding the mixture in a suitable apparatus.

3. By mixing solutions of the polycarbonate and of the polyphosphonate and evaporating off the solvent while melting the mixture and at the same time extruding the melt.

4. By admixing a solution of the polycarbonate to the melt of the polyphosphonate, evaporating off the solvent while melting the polycarbonate, homogenizing the melt and then extruding the mixture in a suitable apparatus.

Processes 1 to 3 are the preferred mixing processes and process 1 is particularly preferred.

Mills, kneading machines and screw extruders are to be understood as suitable apparatus for the preparation of the polycarbonate/polyphosphonate mixtures according to the invention. Screw extruders, in particular twin-screw extruders, are the preferred apparatus.

Extruded films can be produced from the mixtures according to the invention in a known manner, for example in the usual three-zone single flight screws according to the state of the art, shaping to give films being effected either via sheet dies, to give flat films, or via film blow-heads, to give blown films.

Halogen-free flame-resistant polyphosphonate/polycarbonate films according to the invention can also be produced by the casting method in a known manner. The polyphosphonate/polycarbonate mixture is dissolved in a common solvent, such as, for example, methylene chloride or a mixture of methylene chloride and chloroform, and this solution is then processed to films by the casting method.

The halogen-free, noncorrosive polyphosphonate/polycarbonate mixed films according to the invention have a high mechanical strength, a high heat distortion point and stability to prolonged heat exposure, good electrical insulating properties and an excellent fire resistance, as a result of which they are outstandingly suitable for use in electrical components such as, for example, those in the fields of traffic, transportation and telecommunications, and in electrical components of data processing units, in which such a combination of properties is particularly valuable.

The monomeric and polymeric additives and fillers known from polyphosphonate chemistry and polycarbonate chemistry can also be added to the mixtures according to the invention.

Examples which may be mentioned in this connection are dyestuffs, pigments, mold release agents, stabilizers against the action of moisture, heat and UV light; lubricants and fillers such as glass powder, quartz products, graphite, molybdenum sulphide, metal powders, powders of higher-melting plastics, for example polytetrafluoroethylene powder, natural fibers such as cotton, sisal and asbestos, and furthermore glass fibers of the most diverse nature, metal filaments and fibers which are stable during residence in the melt of the polycarbonates and which do not noticeably damage the polycarbonates.

The polyphosphonate/polycarbonate films mentioned in the Examples were produced by melting the polycarbonate and the polyphosphonate together with simultaneous intimate mixing of the melt, the homogenized mixture being extruded via a sheet die and drawn to films, with the thicknesses given in the Examples, via a chill-roll unit.

The tensile strength and elongation at break of the films were tested in accordance with the method of DIN 53 455. The specific volume resistivity ($\rho_D$) was tested according to the instructions of VDE 0303, Section 4; the dielectric loss factor (tan $\delta$) was tested according to the instructions of VDE 0303, Section 3.

The fire resistance of the films was tested in accordance with the method of the UL-94 test, paragraph 8, "Vertical Burning Test for Classifying Materials 94 VTM-0, 94 VTM-1 or 94 VTM-2", June 25, 1979.

EXAMPLES

EXAMPLE 1

80% by weight of a polycarbonate (component A) which is based on bisphenol A having a relative solution viscosity ($\eta_{rel}$) of 1.420 (measured in 0.5% strength solution in methylene chloride at 25° C.) and a molecular weight ($\overline{M}_w$) of 40,000 (measured by the light scattering method) and 20% by weight of a polymethylphosphonate (component B) which is based on 4,4'-dihydroxydiphenyl having a relative solution viscosity ($\eta_{rel}$) of 1.316 and a number-average molecular weight ($\overline{M}_n$) of 26,700 and prepared according to Example 1 of German Patent Application No. P 29 44 093.5 (LeA 19,968) are melted together in a twin-screw extruder and intimately mixed and the homogenized melt is extruded via a sheet die to give films 0.05 mm, 0.1 mm and 0.2 mm thick. The properties of these films are compared with the properties of a pure polycarbonate film of component A (for the production, see Comparison Example 1) and with the properties of a pure polymethylphosphonate film of component B (for the production, see Comparison Example 2) in Table 1.

COMPARISON EXAMPLE 1

Films 0.05 mm, 0.1 mm and 0.2 mm thick were extruded from a polycarbonate of the type of component A on a twin-screw extruder which was provided with a sheet die. The properties of the film are given by way of comparison in Table 1.

COMPARISON EXAMPLE 2

Films 0.05 mm, 0.1 mm and 0.2 mm thick were extruded from a polymethylphosphonate of the type of component B on a twin-screw extruder which was provided with a sheet die. The properties of the film are given by way of comparison in Table 1.

TABLE 1

Comparison of the Properties of the Films From Example 1, Comparison Example 1 and Comparison Example 2

| Film Thickness (in mm) | | Tensile Strength (psi)/Elongation at Break (%) | Specific Volume Resistivity ($\int_D$) ($\Omega \cdot$ cm) | tan $\delta$ (20°/150°) | Burning Properties According to UL-94 |
|---|---|---|---|---|---|
| 0.05 | Comparison Example 2 | 7251.5/30 | $\dfrac{2 \cdot 10^{16}}{5 \cdot 10^{12}}$ (140°) | $\dfrac{3 \cdot 10^{-3}}{4 \cdot 10^{-2}}$ (140°) | 94-V-O |
| | Comparison Example 1 | 14503.0/120 | $\dfrac{10^{16}}{4 \cdot 10^{15}}$ | $\dfrac{2 \cdot 10^{-3}}{4 \cdot 10^{-3}}$ | 94-V-2 |

TABLE 1-continued
Comparison of the Properties of the Films From Example 1, Comparison Example 1 and Comparison Example 2

| Film Thickness (in mm) | | Tensile Strength (psi)/Elongation at Break (%) | Specific Volume Resistivity ($\int_D$) ($\Omega \cdot$ cm) | tan δ (20°/150°) | Burning Properties According to UL-94 |
|---|---|---|---|---|---|
| 0.10 | Example 1 | 14503.0/130 | $\frac{5 \cdot 10^{16}}{2 \cdot 10^{15}}$ | $\frac{1.7 \cdot 10^{-3}}{5 \cdot 10^{-3}}$ | 94-V-O |
| | Comparison Example 2 | 7251.5/30 | $\frac{2 \cdot 10^{16}}{5 \cdot 10^{12} (140° C.)}$ | $\frac{3 \cdot 10^{-3}}{4 \cdot 10^{-2} (140°)}$ | 94-V-O |
| | Comparison Example 1 | 14503.0/120 | $\frac{10^{16}}{4 \cdot 10^{15}}$ | $\frac{2 \cdot 10^{-3}}{4 \cdot 10^{-3}}$ | burns down, unclassifiable |
| | Example 1 | 15228/130 | $\frac{5 \cdot 10^{16}}{2 \cdot 10^{15}}$ | $\frac{1.7 \cdot 10^{-3}}{5 \cdot 10^{-3}}$ | 94-V-O |
| 0.20 | Comparison Example 2 | 7251.5/30 | $\frac{2 \cdot 10^{16}}{5 \cdot 10^{12} (140° C.)}$ | $\frac{3 \cdot 10^{-3}}{4 \cdot 10^{-2} (140°)}$ | 94-V-O |
| | Comparison Example 1 | 14503.0/120 | $\frac{10^{16}}{4 \cdot 10^{-15}}$ | $\frac{2 \cdot 10^{-3}}{4 \cdot 10^{-3}}$ | burns down, unclassifiable |
| | Example 1 | 13778/130 | $\frac{5 \cdot 10^{16}}{2 \cdot 10^{15}}$ | $\frac{1.7 \cdot 10^{-3}}{5 \cdot 10^{-3}}$ | 94-V-O |

EXAMPLE 2

40% by weight of a polycarbonate of the type of component A and 60% by weight of a polymethylphosphonate of the type of component B were melted together in a twin-screw extruder and intimately mixed and the homogenized melt was extruded to give films 0.05 mm, 0.1 mm and 0.2 mm thick. The properties of these films are given in Table 2.

TABLE 2

| Film Thickness (in mm) | Tensile Strength (psi) Elongation at Break (%) | Specific Volume Resistivity ($\int_D$) ($\Omega \cdot$ cm) | tan δ (20°/150°) | Burning Properties According to UL-94 |
|---|---|---|---|---|
| 0.05 | 10171 120% | $\frac{5 \cdot 10^{16}}{2 \cdot 10^{15}}$ | $\frac{2 \cdot 10^{-3}}{5 \cdot 10^{-3}}$ | 94-V-O |
| 0.10 | 10171 120% | $\frac{5 \cdot 10^{16}}{2 \cdot 10^{15}}$ | $\frac{2 \cdot 10^{-3}}{5 \cdot 10^{-3}}$ | 94-V-O |
| 0.20 | 10171 120% | $\frac{5 \cdot 10^{16}}{2 \cdot 10^{15}}$ | $\frac{2 \cdot 10^{-3}}{5 \cdot 10^{-3}}$ | 94-V-O |

EXAMPLE 3

85% by weight of a polycarbonate of the type of component A and 15% by weight of a polymethylphosphonate of the type of component B were melted together in a twin-screw extruder and intimately mixed and the homogenized melt was extruded to give films 0.05 mm, 0.1 mm and 0.2 mm thick. The properties of these films are given in Table 3.

TABLE 3

| Film Thickness (in mm) | Tensile Strength (psi) Elongation at Break (%) | Specific Volume Resistivity ($\int_D$) ($\Omega \cdot$ cm) | tan δ (20°/150°) | Burning Properties According to UL-94 |
|---|---|---|---|---|
| 0.05 | 12350 140% | $\frac{6 \cdot 10^{16}}{8 \cdot 10^{15}}$ | $\frac{1.3 \cdot 10^{-3}}{6 \cdot 10^{-3}}$ | 94-V-O |
| 0.10 | 13077 135% | $\frac{6 \cdot 10^{16}}{8 \cdot 10^{15}}$ | $\frac{1.3 \cdot 10^{-3}}{6 \cdot 10^{-3}}$ | 94-V-O |
| 0.20 | 12350 140% | $\frac{6 \cdot 10^{16}}{8 \cdot 10^{15}}$ | $\frac{1.3 \cdot 10^{-3}}{6 \cdot 10^{-3}}$ | 94-V-O |

EXAMPLE 4

80% by weight of a polycarbonate of the type of component A and 20% by weight of a polymethylphosphonate (component B) which is based on bisphenol A, has a relative solution viscosity ($\eta_{rel}$) of 1.280 and a number-average molecular weight ($\overline{M}_n$) of 22,000 and is prepared according to Example 9 of German Patent Application No. P 29 44 093.5 (LeA 19,968), are melted together in a twin-screw extruder and intimately mixed and the homogenized melt is extruded via a sheet dye to give films 0.05 mm, 0.1 mm and 0.2 mm thick. The properties of these films are given in Table 4.

TABLE 4

| Film Thickness (in mm) | Tensile Strength (psi) Elongation at Break (%) | Specific Volume Resistivity ($\int_D$) ($\Omega \cdot$ cm) | tan δ (20°/150°) | Burning Properties According to UL-94 |
|---|---|---|---|---|
| 0.05 | 13077 130% | $\frac{6 \cdot 10^{16}}{8 \cdot 10^{15}}$ | $\frac{1.3 \cdot 10^{-3}}{6 \cdot 10^{-3}}$ | 94-V-O |
| 0.10 | 13077 135% | $\frac{6 \cdot 10^{16}}{8 \cdot 10^{15}}$ | $\frac{1.3 \cdot 10^{-3}}{5 \cdot 10^{-3}}$ | 94-V-O |
| 0.20 | 13778 140% | $\frac{6 \cdot 10^{16}}{8 \cdot 10^{15}}$ | $\frac{1.3 \cdot 10^{-3}}{5 \cdot 10^{-3}}$ | 94-V-O |

EXAMPLE 5

17% by weight of a polymethylphosphonate which is based on bisphenol A, having a relative solution viscosity ($\eta_{rel}$) of 1.280 and a number-average molecular weight ($\overline{M}_n$) of 22,000 and is prepared according to Example 9 of German Patent Application No. P 29 44

093.5 (LeA 19,968), and 83% by weight of a polycarbonate which is based on bisphenol A and has a weight-average molecular weight ($\overline{M}_w$) of 80,000 and a relative solution viscosity ($\eta_{rel}$) of 1.80 were dissolved in methylene chloride in an overall concentration of 15% by weight. This solution was filtered and degased and was cast to give a film 0.05 mm thick on a drum casting machine. This film has the following properties:

| | |
|---|---|
| Tensile strength: | 13077 psi |
| Elongation at break: | 100% |
| Specific volume resistivity ($\int_D$) (20° C./150° C.): | $8 \cdot 10^{16}/2 \cdot 10^{15} \, \Omega \cdot cm$ |
| tan δ at 50 Hz (20° C./150° C.): | $3 \cdot 10^{-3}/5 \cdot 10^{-3}$ |
| Burning properties according to UL-94: | 94-V-O |

To test the resistance to solvents, strips of film 0.05 mm thick and 15 mm wide were wound spirally around a glass rod 8 mm in diameter and were immersed in 1:3 toluene/n-propanol mixtures for ten seconds. The tensile strength and elongation at break of the films treated in this way were then determined. The values obtained are listed in Table 5.

TABLE 5

| Example | Tensile Strength (psi) | Elongation at Break (%) |
|---|---|---|
| 1 | 13077 | 110 |
| 2 | 10171 | 100 |
| 3 | 14503 | 120 |
| 4 | 13077 | 110 |
| 5 | 12617 | 100 |
| Comparison Example 1 | 14503 | 120 |
| Comparison Example 2 | become brittle | could not be measured |

What is claimed is:

1. A composition comprising
   (a) 40 to 85% by weight of a halogen-free aromatic polycarbonate having a weight-average molecular weight greater than 24,000, and
   (b) 60 to 15% by weight of a halogen-free aromatic polyphosphonate having a number-average molecular weight of about 11,000 to 200,000.

2. The composition of claim 1, wherein said halogen-free aromatic polycarbonate is one having a weight-average of about 35,000 to 120,000.

3. The composition of claim 1, wherein said (a) is from about 60 to 85% by weight and said (b) is from about 40 to 15% by weight.

4. Films prepared of a composition comprising
   (a) 40 to 85% by weight of a halogen-free aromatic polycarbonate having a weight-average molecular weight greater than 24,000, and
   (b) 60 to 15% by weight of a halogen-free aromatic polyphosphonate having a number-average molecular weight of about 11,000 to 200,000.

5. The films of claim 4 prepared by extrusion.

6. The films of claim 4 prepared by casting.

7. A process for preparing polycarbonate/polyphosphonate compositions comprising melting a composition comprising 40 to 85% by weight of a halogen-free aromatic polycarbonate having a weight-average molecular weight greater than 24,000 and 60 to 15% by weight of a halogen-free aromatic polyphosphonate having a number-average molecular weight of about 11,000 to about 200,000 with simultaneous or subsequent intimate mixing and subsequent extrusion of the homogenized melt in a suitable apparatus.

8. A process for preparing polycarbonate/polyphosphonate compositions comprising melting a halogen-free aromatic polycarbonate having a weight-average molecular weight greater than 24,000 and metering into the resulting melt a halogen-free aromatic polyphosphonate having a number-average molecular weight of about 11,000 to about 200,000, homogenizing the melt and then extruding the mixture in a suitable apparatus, said composition comprising 40 to 85% by weight of said aromatic polycarbonate and 60 to 15% by weight of said polyphosphonate.

9. A process for preparing polycarbonate/polyphosphonate compositions comprising mixing solutions of said polycarbonates and of said polyphosphonates and evaporating off the solvents while melting the mixture and at the same time extruding the melt, said composition comprising
   (a) 40 to 85% by weight of a halogen-free aromatic polycarbonate having a weight-average molecular weight greater than 24,000, and
   (b) 60 to 15% by weight of a halogen-free aromatic polyphosphonate having a number-average molecular weight of about 11,000 to 200,000.

10. A process for preparing polycarbonate/polyphosphonate compositions comprising admixing a solution of a polycarbonate to a melt of polyphosphonate, evaporating off the solvent while melting said polycarbonate, homogenizing the melt and then extruding in a suitable apparatus, said composition comprising
    (a) 40 to 85% by weight of a halogen-free aromatic polycarbonate having a weight-average molecular weight greater than 24,000, and
    (b) 60 to 15% by weight of a halogen-free aromatic polyphosphonate having a number-average molecular weight of about 11,000 to 200,000.

11. A composition comprising
    (a) 40 to 85% by weight of a halogen-free aromatic polycarbonate having a weight-average molecular weight greater than 24,000, and
    (b) 60 to 15% by weight of a halogen-free aromatic polyphosphonate having a number-average molecular weight of about 13,000 to 80,000.

* * * * *